March 12, 1935.  L. G. PLANT  1,993,800
CONVEYING AND ELEVATING MECHANISM
Filed Aug. 19, 1932   9 Sheets-Sheet 1
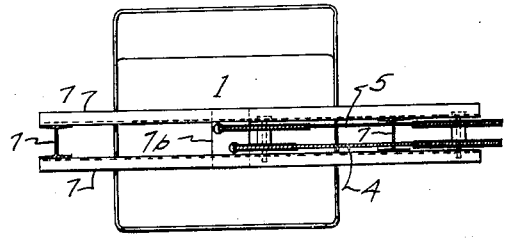
FIG. 1-A
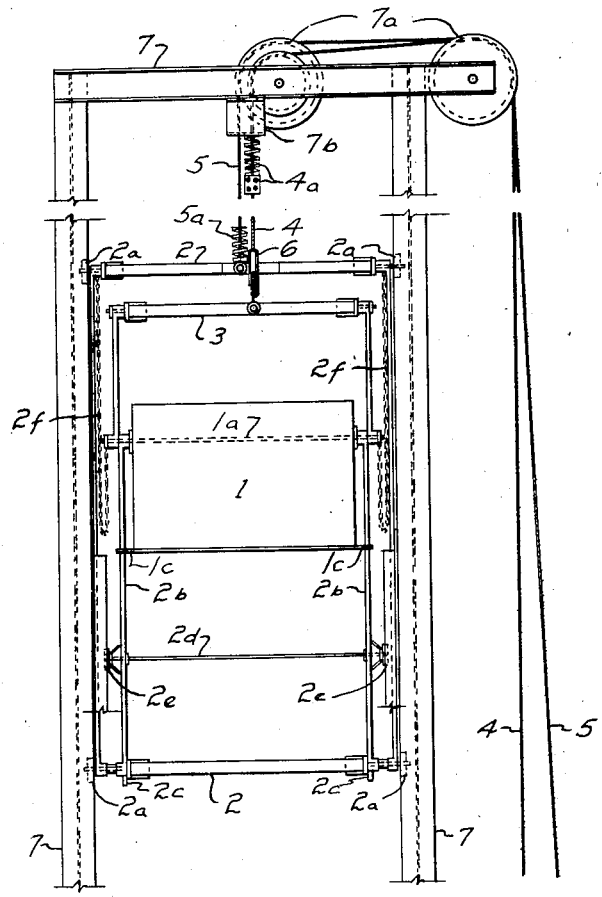
FIG. 1
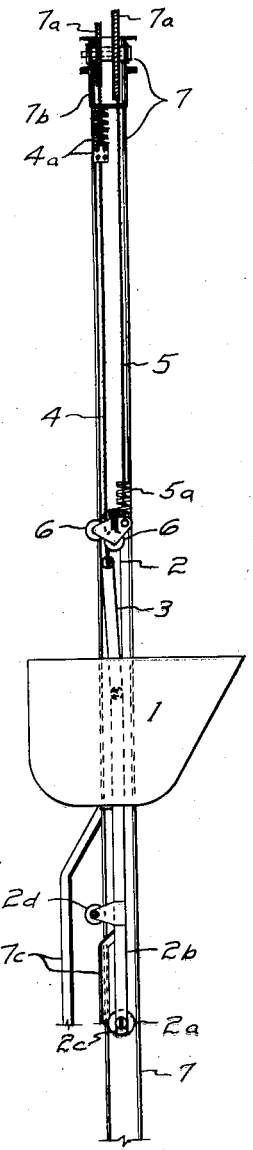
FIG. 2
INVENTOR.
Leland G. Plant
WITNESS
W.H.Jury

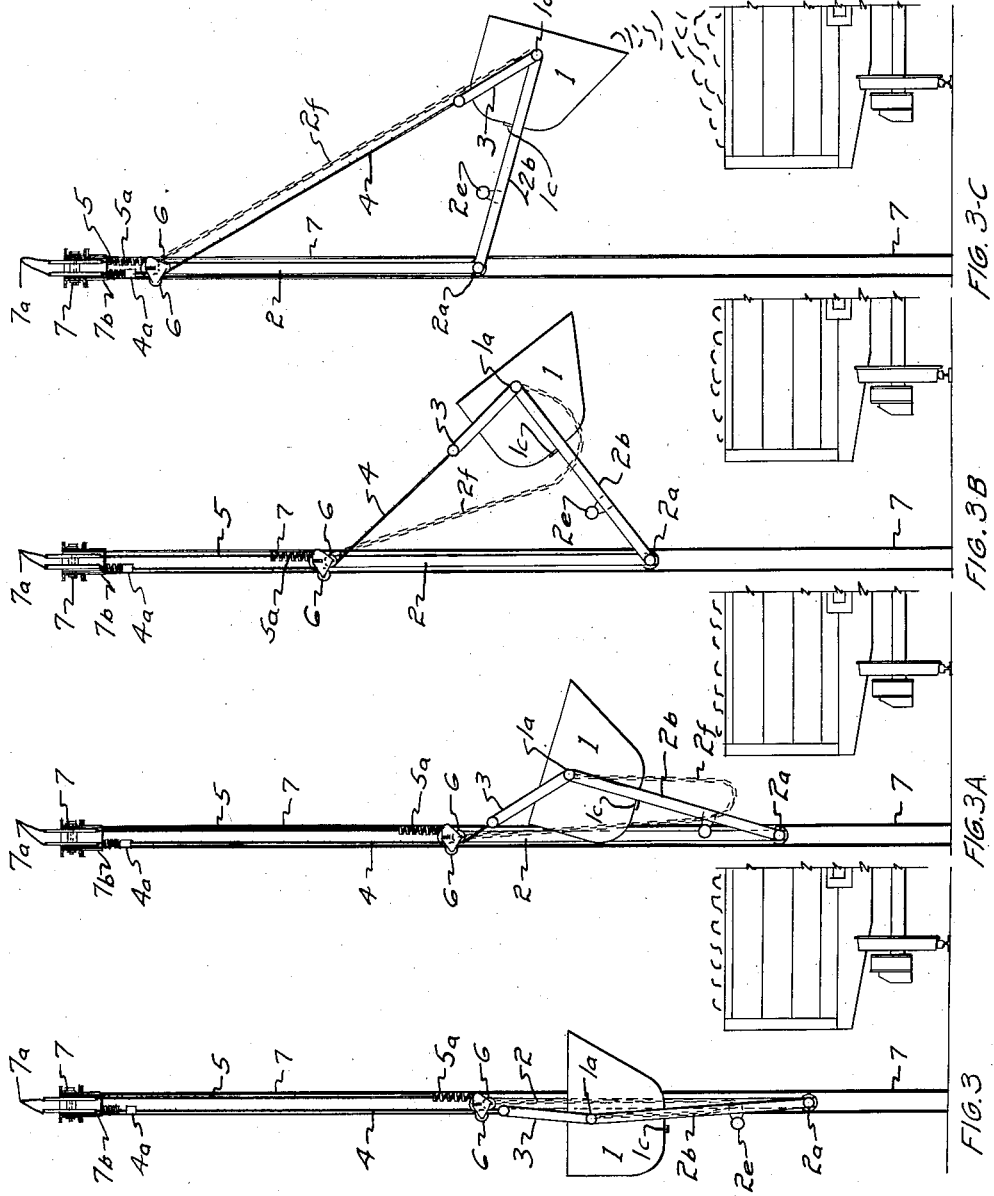

March 12, 1935.　　　　L. G. PLANT　　　　1,993,800
CONVEYING AND ELEVATING MECHANISM
Filed Aug. 19, 1932　　　9 Sheets-Sheet 3
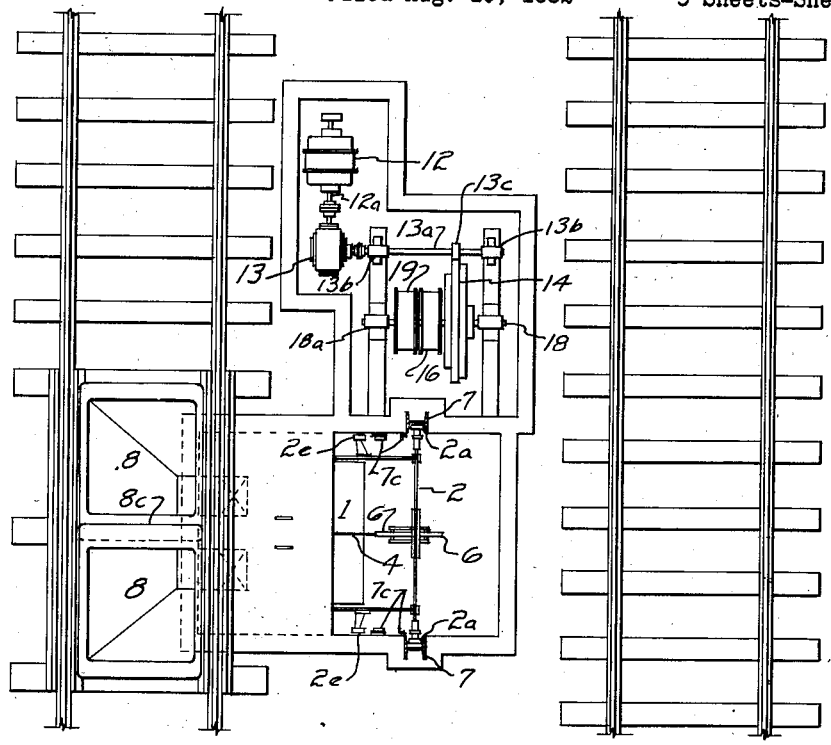
FIG. 4-A
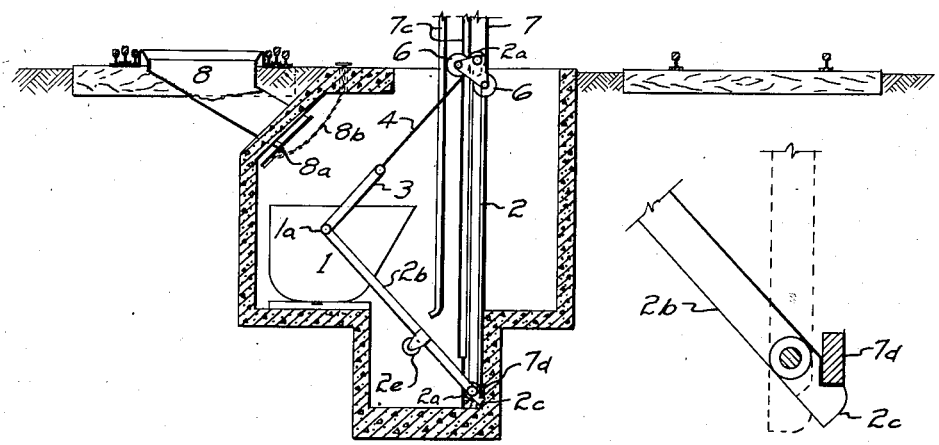
FIG. 4　　　　FIG. 4-B
INVENTOR.
Leland G. Plant
WITNESS
W.H.Jury March 12, 1935.   L. G. PLANT   1,993,800
CONVEYING AND ELEVATING MECHANISM
Filed Aug. 19, 1932   9 Sheets-Sheet 4
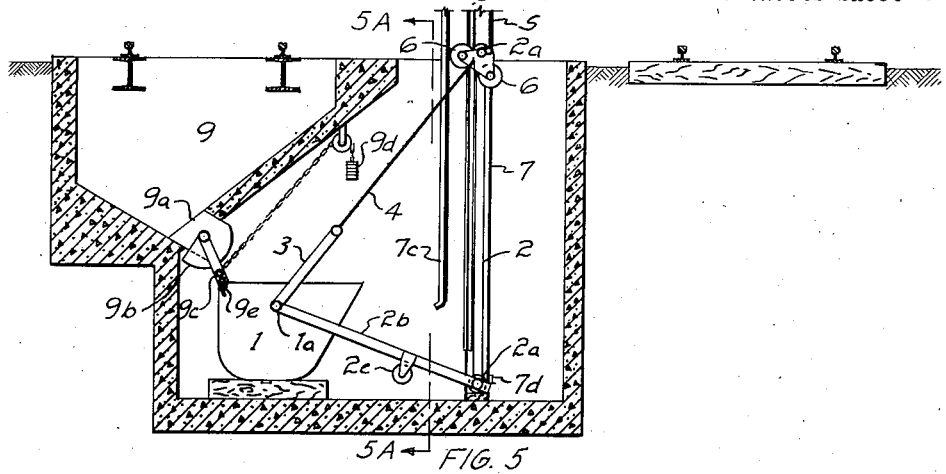
FIG. 5
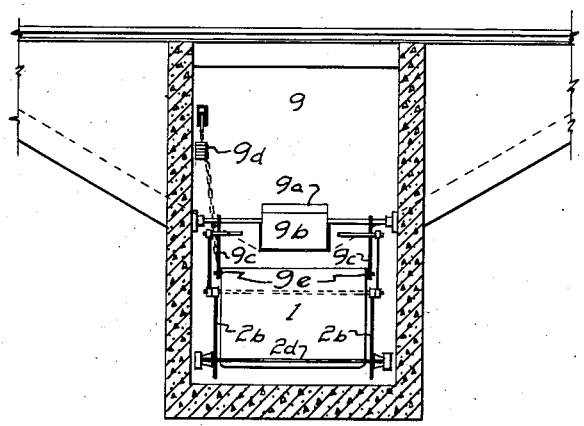
FIG. 5A
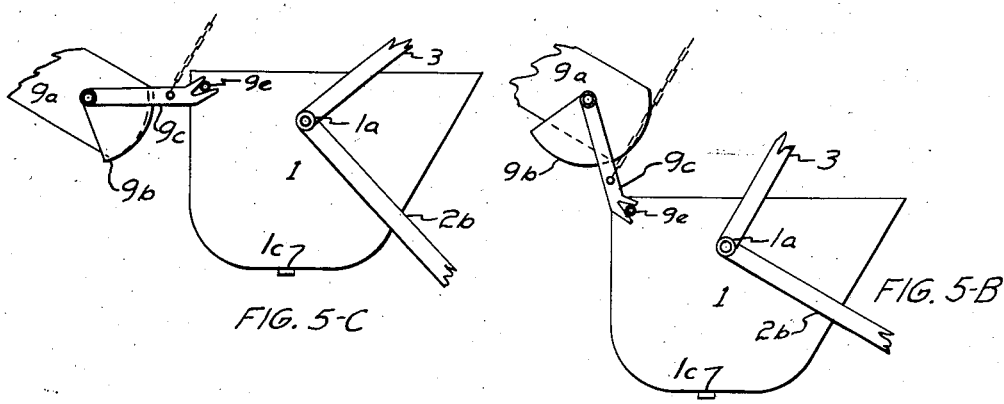
FIG. 5-C   FIG. 5-B
INVENTOR.
Leland G. Plant
WITNESS
W.H.Jury March 12, 1935.  L. G. PLANT  1,993,800
CONVEYING AND ELEVATING MECHANISM
Filed Aug. 19, 1932   9 Sheets-Sheet 5

FIG. 6-A

INVENTOR.
Leland G. Plant

WITNESS
W.H.Jury

March 12, 1935.   L. G. PLANT   1,993,800
CONVEYING AND ELEVATING MECHANISM
Filed Aug. 19, 1932   9 Sheets-Sheet 6
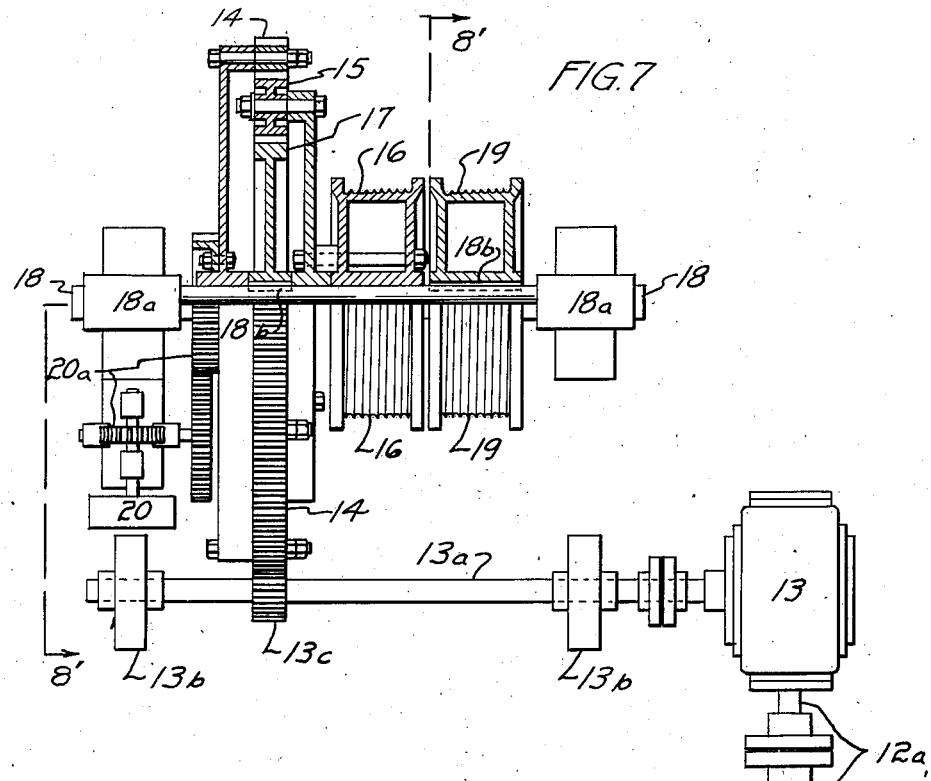
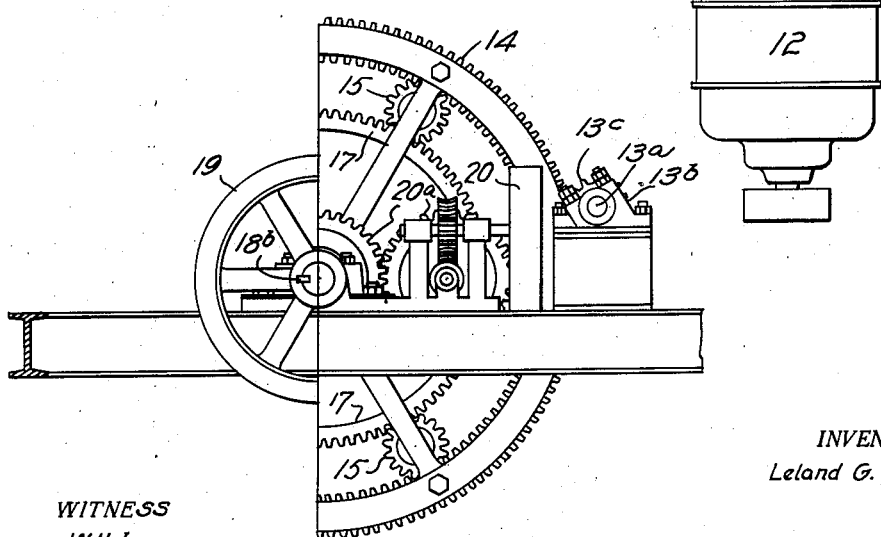
INVENTOR.
Leland G. Plant
WITNESS
W. H. Jury March 12, 1935.  L. G. PLANT  1,993,800
CONVEYING AND ELEVATING MECHANISM
Filed Aug. 19, 1932   9 Sheets-Sheet 7
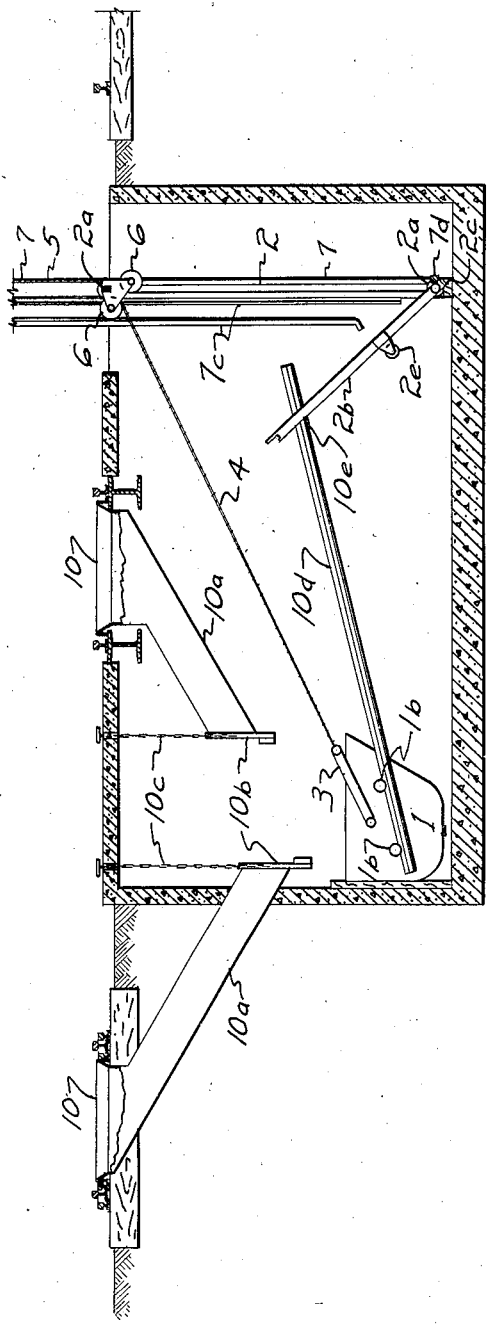
INVENTOR.
Leland G. Plant
WITNESS
W.H. Jury March 12, 1935.  L. G. PLANT  1,993,800
CONVEYING AND ELEVATING MECHANISM
Filed Aug. 19, 1932  9 Sheets-Sheet 8

INVENTOR.
Leland G. Plant

WITNESS
W.H.Jury

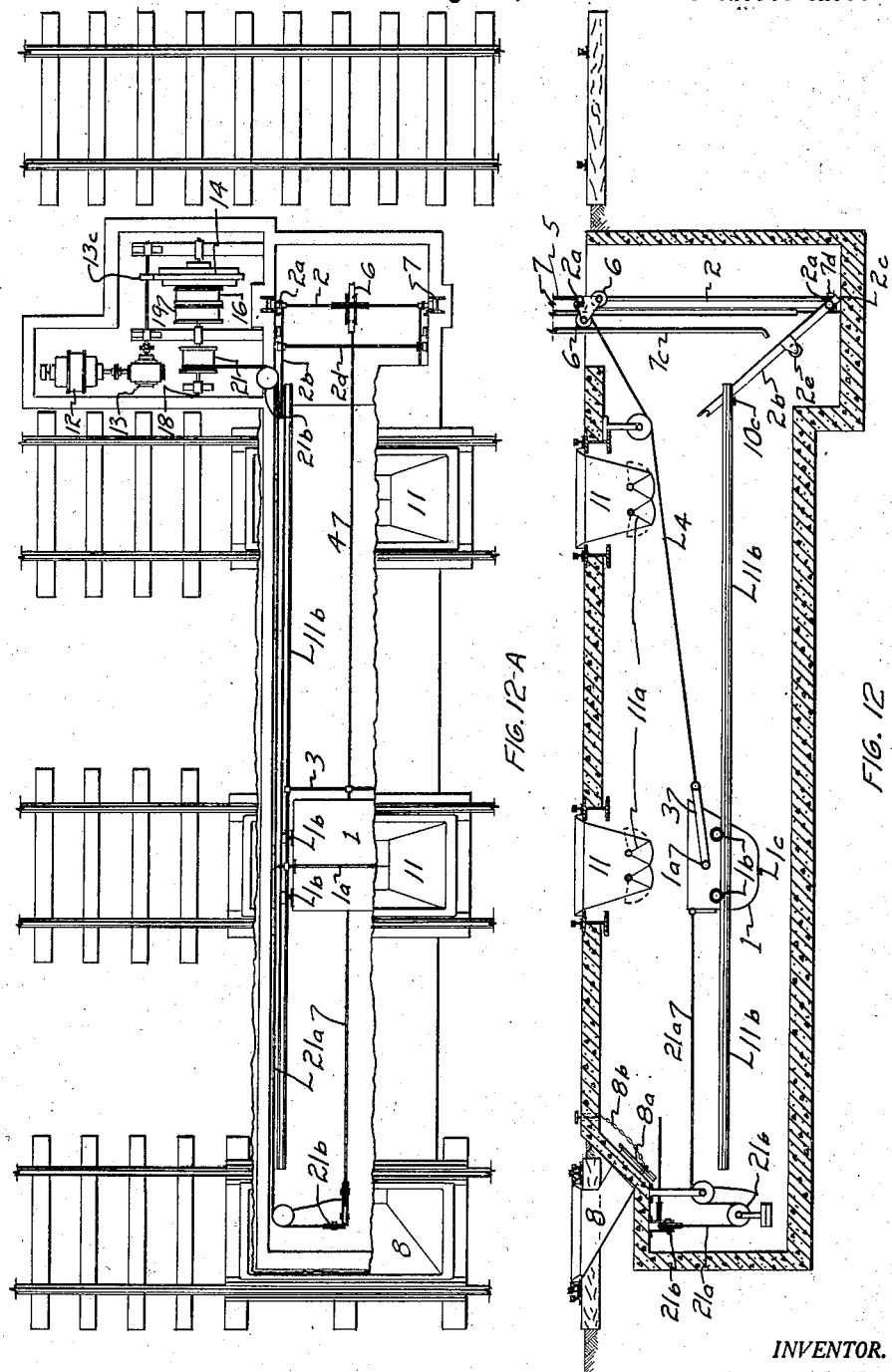

Patented Mar. 12, 1935

1,993,800

UNITED STATES PATENT OFFICE 1,993,800

CONVEYING AND ELEVATING MECHANISM

Leland G. Plant, Chicago, Ill.

Application August 19, 1932, Serial No. 629,464

6 Claims. (Cl. 214—120)

This is an invention in conveying and elevating mechanism of particular value for collecting ashes discharged from steam locomotives and loading these ashes into a railroad car or for elevating locomotive coal discharged from a railroad car and delivering this coal either directly into a locomotive tender or into an elevated bin from where it can flow by gravity into the tender. This invention is also especially suited for transferring bulk materials from one railroad car to another or elevating wet sand from a car to a storage bin for subsequent drying and delivery to locomotives. The purpose of this invention is to provide an efficient, capable and dependable mechanism having unique structural advantages for railway use.

One condition peculiar to railway service for which this invention is particularly adapted is the clearance space to both sides and directly above each track required for the safe operation of cars and locomotives thereon. Where it is desired to conserve space or for other reasons, to locate tracks as closely together as possible, the space occupied by the fixed structural members of an elevator shaftway erected between railway tracks is an important consideration and any element of design enabling its fixed structural width between tracks to be reduced becomes a valuable advantage. Likewise, any unique feature in the design of such elevating equipment is an advantage which enables this equipment to discharge from a suitable dumping distance directly over a railway car or locomotive tender without either permanently encroaching upon the safe overhead track clearance or without necessitating a movable member auxiliary to the conveying bucket which member, when placed in a position to facilitate discharge from said conveying bucket to a suitable dumping point above the car or locomotive tender, is then within the prescribed track clearance and must be moved away from this dumping point to afford full clearance.

All mechanism heretofore employed for the services above enumerated are inferior to the present invention in respect to their greater fixed structural width between tracks and their higher discharge point of the conveying bucket necessary if the required overhead clearance of the supporting structure is observed. This, in turn, necessitates an auxiliary conveying or directing member, ordinarily an inclined pivoted chute, between the conveying bucket and desired dumping point above the car or locomotive tender, which auxiliary member must be moved away from the dumping position when not in use, to provide prescribed safe clearance for cars or locomotives moving on the tracks below it. When such an auxiliary deflecting member is not provided the hoisting structure either encroaches upon prescribed safe track clearance or the conveying bucket must discharge from so great a height above the track level that uneven loading of the car or locomotive tender and some spillage of material may result. This condition is especially objectionable for loading ashes into a car for the reason that when a light, dusty material of this nature is dumped it may be blown and scattered about instead of dropping into the ash car or, in the case of coal dumped upon a locomotive tender from such a height as to break some of the coal lumps into slack coal.

The present invention is the first to provide a fixed structural clearance between adjacent tracks which need not exceed the width of a single rolled steel beam standing in a vertical position. This invention is also the first to provide a conveying bucket, which can be moved outwardly from the face of the hoist tower and tilted into a dumping position so close to the top of a car or locomotive tender as to lie inside the track clearance dimensions above said car or tender without the support of any fixed structural projections from the hoist tower that infringe upon said clearance dimensions. This conveying and elevating mechanism is therefore the first of its kind in which material from the conveying bucket may be dropped upon the top of a car or locomotive tender from a dumping point as close thereto as desired to avoid spillage or breakage and to secure uniform loading without having any fixed parts that lie within the track clearance and without any movable apron or chute member between the discharge lip of the conveying bucket and said car or tender.

Another characteristic of this invention new to conveying and elevating mechanism for ashes, coal and other materials common to railway use is the differential speed of the elevating bucket obtained without varying the speed of the driving motor. This feature is utilized to obtain a relatively faster movement of the conveying bucket when traveling in a horizontal or sloping direction and a relatively slower speed when moving in an upright direction, thus equalizing the load upon the source of power provided for operating the conveying bucket. This is a real advantage in the case of conveying and elevating equipment for collecting ashes, coal and other materials deposited from cars or locomotives on one or a group of tracks and delivering these materials into a car or locomotive tender standing on an adjacent track because the conveying bucket first moves in a horizontal or sloping direction to collect said materials from below the car or locomotive positions at which they discharge these materials. The dumping operation subsequently involves a sidewise and turning movement of the conveying bucket over the car or locomotive tender into which it discharges. By means of the novel hoisting mechanism employed in this invention, the rate at which power must be supplied to move the conveying bucket thru its travel cycle is partially equalized between its loading, elevating and discharging phases by automatically accelerating its speed in a horizontal direction as contrasted with its speed in a vertical direction. While the depth of pit required for loading the conveying bucket below a single or multiple tracks is itself only a relative matter to which no novelty can be attached, the nature of this invention is such that its mechanism is particularly adapted to accomplish the loading of the conveying bucket in a shallow pit beneath either single or multiple tracks with any form of loading mechanism now commonly in use.

While the conveying bucket of this invention can be readily loaded in a relatively shallow pit with any type loading apparatus heretofore employed, it is especially adapted to being loaded from a novel design of track hopper and gate constituting a part of the invention in its preferred form. The main object of this track hopper and bucket loading arrangement is to lower construction costs, particularly when installed for the purpose of collecting and loading the ashes discharged from locomotives standing on tracks above the conveyor bucket. The expense of such construction is generally proportional, not only to the depth of pit excavation required but to its length and breadth and especially to the structural features required for supporting the railway track above the bucket loading pit. While there is no novelty in merely chuting the material dropped into the track hopper to one side of the track and thence into the conveyor bucket in order to avoid excavation directly under the track, the use of a sectionalized track hopper comprising a plurality of metal hopper pans each adapted to be placed between or below the usual track structure is new. In its preferred form, these track hopper pans lie in rectangular openings between the rails and their supporting ties, thus not disturbing the fundamental track structure or causing a "hard spot" in the track, which is the customary term for any bridge or structural supports over a track pit which lack the resilience afforded by ordinary track ties lying in ballast. This is a particularly important consideration where the bucket loading hopper is positioned on a main line track over which trains may be run at high speed.

By means of these novel track hopper pans, no pit excavation is necessary directly below the railway track, hence no beam or bridging structure to support the track over the entire width of the pit as usually required. The hopper pans being of non-collapsible metal construction may be buried in the ballast below the track and serve to chute materials deposited therein into a conveying bucket in a pit to one side of the track. Since it is desirable to minimize the size of this pit by conserving space therein, another novel feature is embodied in this track hopper pan construction which consists of outlet gates of the "under-cut" type which are pivoted to a pin projecting from the face or lip of the outlet spout from each pan and rotate downwards to open until the mouth of the spout is entirely cleared, or rotate upwards to close until said spout mouth is entirely covered. An important detail in this construction is the slight angularity between the axis of the pivot pin and the face of the spout mouth such that if any unbreakable lump of material is lodged in the spout mouth as the gate is being rotated upwardly to a closed position it will not block the movement of the gate but can be forced up over the upper edge of said gate.

A further advantage of these novel track hopper pans is their adaptability to a group of railway tracks upon which cars or locomotives stand to discharge their coal, ashes, sand or other bulk material. Heretofore it has been the practice in collecting such bulk materials from a group of track hoppers to move the conveying bucket in a horizontal path to a loading position below each track hopper. This horizontal movement of the conveying bucket away from the elevating shaftway complicates the hoisting mechanism with the addition of sheaves and cables for moving the bucket in this direction. While it is possible to slope the bucket supports below the tracks so that when released by the hoist, the conveying bucket would gravitate away from the elevating shaftway to a position directly below the remote tracks, this would ordinarily involve too great a pit depth for practical consideration. But by the use of these novel track hopper pans with an extended spout sloping to one side thereof, materials deposited in a track hopper remote from the elevating shaftway can be chuted into the conveying bucket at the foot of a slope from the shaftway, said slope being of sufficient pitch to gravitate the bucket to its loading position without necessitating an impractical pit depth. In this position the bucket may receive materials spouted through a plurality of said track hopper pans from two adjacent tracks thus obviating the necessity for a separate bucket loading position related to each track.

Another type of railway facility to which this conveying and elevating mechanism is readily adaptable is a combined unit for handling both coal and ashes, the coal being elevated from a track hopper on one side of the elevating shaftway and delivered to a locomotive on the other side of said shaftway, either directly or through an intermediate bin or chute; the ashes being collected from the locomotive track and delivered into a car standing upon the track on the opposite side of the elevating shaftway, either directly or through an intermediate bin or chute.

To illustrate the essential elements and unique features of this invention, the following drawings are submitted:

Figure 1; a front elevation of the hoist tower, the conveying bucket, the bucket bail or carriage and hoisting cables attached thereto.

Figure 1A; a view looking down upon the hoist tower and hoisting cable sheaves.

Figure 2; a side elevation of the hoist tower viewed sectionally from the inner edge of one of the hoist tower columns, to show an end view of the conveying bucket, its bail (or supporting carriage) and the hoisting cables.

Figures 3, 3A, 3B, and 3C are all side elevations of the hoist tower from the same view point as in Fig. 2, but showing the positions progressively occupied by the conveying bucket in the procedure of being projected out from between the hoist tower columns, to a position directly above a car on an adjacent track and then being tilted into a dumping condition so as to discharge its contents into said car.

Figure 4 is another elevation viewed from the same plane as Figs. 2 and 3 inclusive, but in this view, the conveying bucket is shown resting on the floor of the pit, at the termination of its downward movement, in a position to be loaded from the spout of a track hopper.

Figure 4A is a plan view of the track hopper of Fig. 4, showing also, in its adjacent relation, a plan of the hoisting machine employed for actuating the conveying bucket with its bail or supporting carriage as illustrated in the preceding figures, and a sectional plan of the hoist tower columns which serve as guides for the movement of the bucket and its bail (or carriage).

Figure 4B is an enlarged detail of the lower part of the bucket bail or carriage shown in preceding figures, illustrating the manner in which a member of this carriage is latched to the foot of the hoist column when the conveying bucket has assumed its loading position.

Figure 5 is another elevation viewed from the same plane as the preceding drawings and also showing the conveying bucket in a position of rest at the termination of its downward movement; but in distinction to Fig. 4, this view depicts an enlarged track hopper with spout having a radial undercut gate interlocking with the bucket.

Figure 5A is a front elevation of the conveying bucket, the spout and gate of Fig. 5, viewed from the plane 5A—5A of Fig. 5.

Figures 5B and 5C are both detail end views of the conveying bucket of Fig. 5 and radial undercut gate interlocking therewith; in the closed and open position respectively.

Figure 6A is a sectional elevation of the pit into which the conveying bucket of the preceding figure is lowered, a sectional view of the hoisting machine compartment adjacent thereto and elevation of the hoisting machine therein.

Figure 7 is a plan view of the hoisting machine showing a typical construction employed by this invention for actuating the movements of the conveying bucket.

Figure 8 is an end elevation, partially in section, showing the hoisting machine of Fig. 7 viewed from the plane 8'—8'.

Figure 9 is a sectional elevation below ground level, showing the conveying bucket lowered by means of inclined rails to a position at which it can be charged from either of two extended spouts leading from adjacent track hoppers.

Figure 12 is an end view of the conveying bucket and cross-sectional elevation of a pit extending under three track hoppers wherein said bucket is transferred from the carriage supporting its vertical travel, to horizontal rails upon which it can be moved to positions at which it can be loaded from any of said track hoppers.

Figure 12A is a plan of Fig. 12 partly in section and showing also a plan of the adjacent hoisting machine, equipped in this instance with an auxiliary drum for the purpose of drawing the conveying bucket upon horizontal track rails in a direction away from the hoist tower to positions below the several track hoppers.

Figure 6:
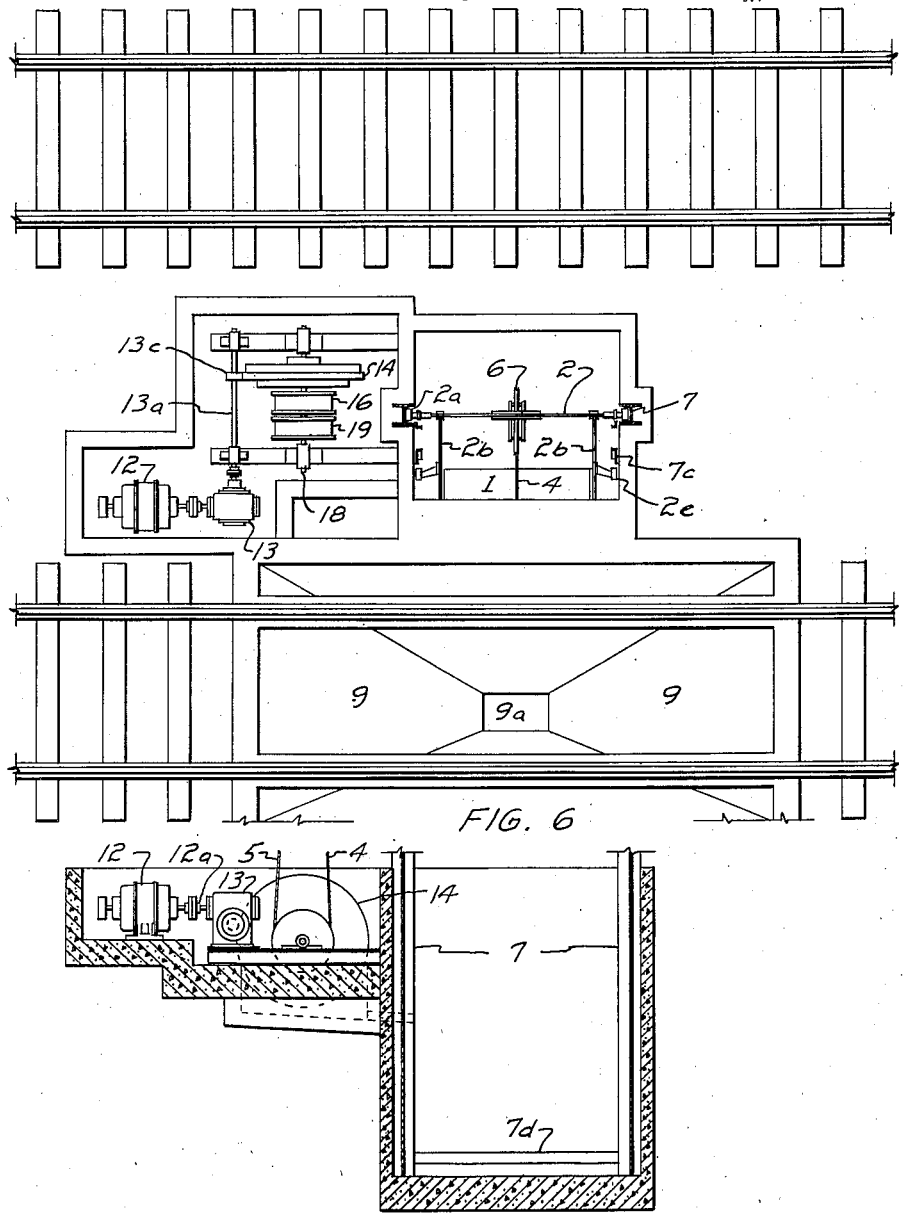
Figure 6 is a plan view of the enlarged track hopper of Fig. 5 showing also, in its adjacent relation, a plan of the hoisting machine employed for actuating the conveying bucket with its bail or supporting carriage and a sectional plan of the hoist tower columns which serve as guides for the movement of the conveying bucket within its carriage.
Figure 11:
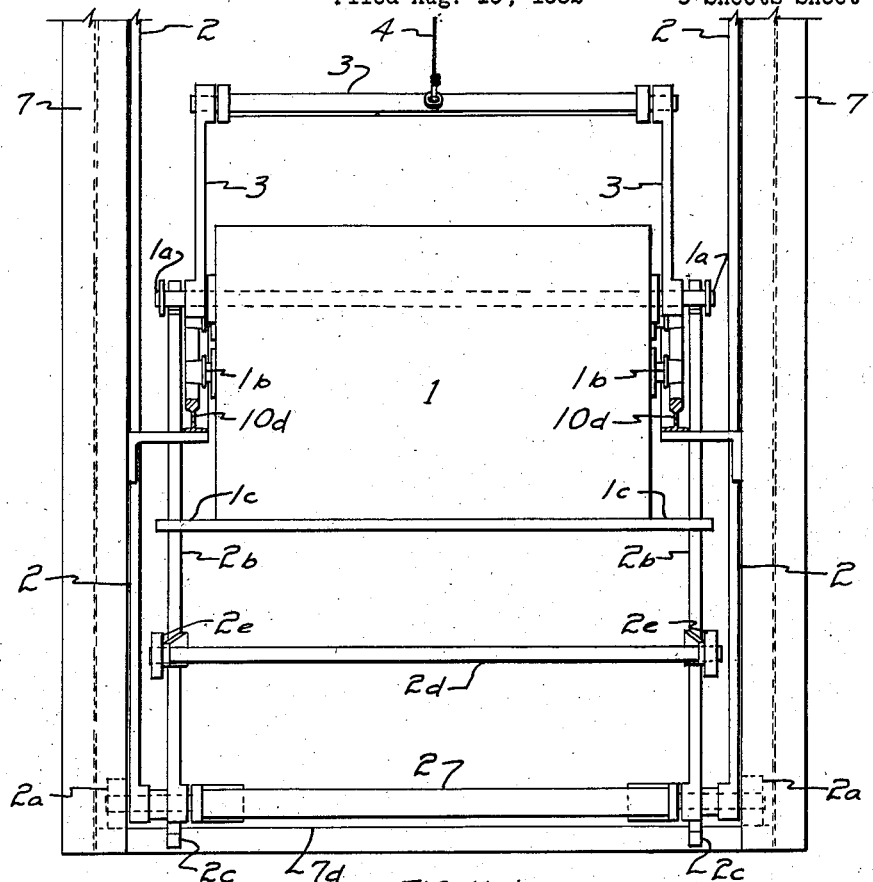
Figure 11 is a front elevation of the conveying bucket, its supporting carriage and the inclined guide rails of Fig. 9, all as in the relative position indicated by the solid lines of Fig. 10.
Figure 10:
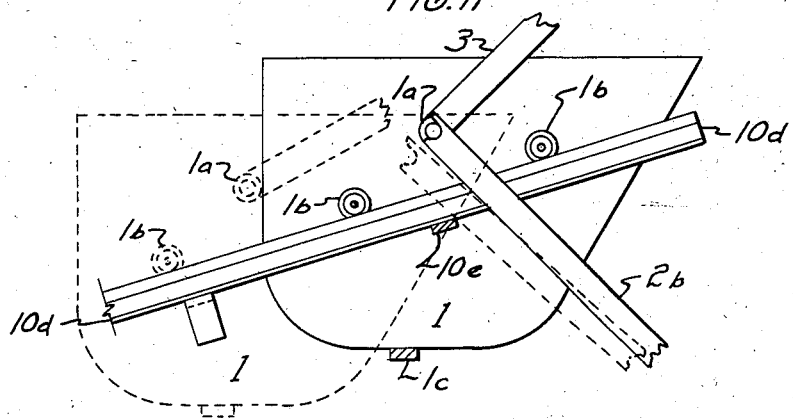
Figure 10 is an end elevation of the conveying bucket and inclined guide rails of Fig. 9, showing details of the construction adapted for transferring said bucket in its movement from the bail or carriage supporting its vertical travel, to said inclined rails for supporting its longitudinal travel and indicating (by means of broken lines) a progressive stage in this longitudinal movement.

The following numerical designations are common to Figures 1 to 6A inclusive, also, Figures 9 to 12A inclusive:

1—conveying bucket,
1a—conveying bucket supporting shaft,
1b—conveying bucket supporting rollers (Figs. 9, 10, 11, 12 and 12A only),
1c—projections for tilting bucket 1,
2—carriage frame (or bail) supporting the conveying bucket 1,
2a—guide rollers of frame 2,
2b—strut members from frame 2 to bucket shaft 1a,
2c—latch at base of strut member 2b,
2d—cross brace between struts 2b,
2e—guide rollers of brace 2b,
2f—chain stops from frame 2 to bucket shaft 1a,
3—yoke attached to shaft 1a, supporting bucket 1,
4—hoist cable attached to yoke 3,
4a—stop block with coil spring on cable 3,
5—hoist cable attached to carriage frame (or bail 2,
5a—coil spring on cable 5, to cushion movement of frame 2,
6—sheaves attached to frame 2 for guiding cable 4,
7—hoist tower (vertical columns and top cross beams),
7a—sheaves for hoist cables 4 and 5 between top cross beams of tower 7,
7b—stop bracket on underside of top on cross beams of tower 7 to engage stop springs 4a and 5a,
7c—auxiliary guide rails attached to the columns of tower 7,
7d—latch bar at foot of tower 7 to engage latch 2c,
8—track hopper of Figs. 4, 4A, 12 and 12A,
8a—gate, pivoted and counterweighted, of hopper 8,
8b—chain for operating gate 8a,
8c—overlapping lip, between adjacent sections of hopper 8,
9—track hopper of Figs. 5, 5A and 6,
9a—spout of hopper 9 for loading bucket 1,
9b—gate (pivoted undercut type) of hopper 9,
9c—latch arm for operating gate 9b by interlocking with bucket 1,
9d—counterweight attached to latch arm 9c,
9e—pin on bucket 1, to interlock with latch arm 9c,
10—track hoppers of Fig. 9,
10a—spouts extending from hoppers 10,
10b—gates of hopper spouts 10b,
10c—chain handles for operating gates 10c, 10d—rails (inclined) on which bucket 1 is moved into a position to be charged from hoppers 10, 10e—stop block for resting position of struts 2b, 11—multiple track hoppers of Figs. 12 and 12A, 11a—gates (radial undercut type) of hoppers 11, The following numerical designations are common to Figs. 7 and 8, and also appear in Figs. 4A, 6, 6A and 12A:

12—hoist driving motor,

12a—drive shaft of motor 12,

13—transmission gear driven by shaft 12a,

13a—shaft driven by gear 13,

13b—bearings of shaft 13a,

13c—pinion on shaft 13a,

14—master gear wheel driven by pinion 13c,

15—planetary gear pinions driven by gear 14,

16—cable winding drum rotated by orbital movement of planetary pinions 15,

17—secondary gear wheel rotated by combined orbital and revolutionary movement of planetary pinions 15, 18—shaft supporting gears 14 and 17, also for supporting cable winding drums, 18a—bearings of shaft 18, 18b—keys in shaft 18, 19—cable winding drum rotated by gear 17 thru shaft 18, 20—rotating switch controlling electric current to motor 12 in relation to travel of master gear 14, 20a—gear train from master gear 14 to switch 20, 21—auxiliary drum keyed to extension of shaft 18 (Fig. 12A only), 21a—cable winding on drum 21, for horizontal back pull of bucket 1 in Figs. 12 and 12A, 21b—counterweight and sheaves to take up slack in cable 21a.

As will be observed from my drawings, the hoist tower may consist of two upright columns, preferably of the type designated as an H section, with two cross members fastened across these vertical members at their top, to form a simple gallows structure 7. These two cross members if applied to opposite faces of the uprights, afford a convenient support for shaft pins on which cable sheaves 7a can be mounted as shown in Fig. 1. These cross pieces may be extended to overhang one side of the gallows frame 7 and thus support additional sheaves in an overhung position as illustrated, but my invention is not limited to this particular tower construction and may, if I elect, be modified to the extent of employing additional upright and cross brace members, and to even positioning a hoisting machine (of the type illustrated in the drawings and described in the following) at the top of the hoist tower, thus obviating use of cable sheaves at the top of this tower.

My invention requires the use of two cables, 4 and 5. One of these cables, 4 is attached to a yoke 3 and the other cable, 5 is attached to the top cross beam of a bail or carriage frame 2. In an arrangement of this invention illustrated by Figs. 7 and 8, each of these two cables (4 and 5) winds over a separate drum in a hoisting machine to be described later and if this machine is located at the foot of the hoist tower, then the sheaves 7a are required at the top of the tower 7, as shown, for transferring the pull on these cables from this hoisting machine to the conveying bucket 1 and its supporting carriage 2. By referring to Fig. 1 and the succeeding drawings, it will be observed that the cable 4, attached to the yoke 3, exerts a direct pull transmitted thru said yoke upon both ends of the bucket shaft 1a to which this yoke is pinned. Also, it will be observed that the other cable 5, which is attached to the bail or carriage frame 2, exerts a pull thereon which is also transmitted to both ends of the bucket shaft 1a, thru strut members 2b. Thus support of the conveying bucket 1 hinges on the shaft 1a at both of its ends, the supporting forces acting upon said shaft being divided between the yoke 3 above the bucket and the struts 2b from below, said yoke and struts, in turn deriving their support from the two cables, 4 and 5 respectively. The bucket shaft 1a to which the yoke 3 and strut members 2b, are each pinned at both ends thereof as above described, may either be a thru shaft extending from one end of the bucket to the other as shown in the drawings, or merely be in the form of projecting pins upon either end of said bucket.

As will be explained in connection with the hoisting machine to be described later, the tensions upon cables 4 and 5 are free to equalize within this machine, or may be equalized by equivalent means connected with the hoisting mechanism, irrespective of the length of each cable depending therefrom. Therefore, when the bucket 1, is in a suspended position between the head and foot of hoist tower 7, its weight must be equally divided between the two cables and the bucket itself must hang so that the two pins by which it is attached to the yoke and struts, will lie as nearly as possible within the vertical plane of the hoist tower and cables. The bucket is only displaced from this position relative to the tower and cables when the travel of one cable is retarded in relation to the other cable. Observe that cable 4 has a stop block and cushioning spring 4a and that the hoist tower frame 7 also has a stop bracket 7h designed to engage 4a, when the bucket 1 and its carriage 2, have reached a predetermined point in their upward travel. At this point the travel of cable 4 is arrested, but as the motor driving the hoisting machine continues to run and as the tension upon the cables is free to equalize within the hoist, the obvious result is that cable 5 still continues to wind upon its drum in the hoisting machine.

The immediate effect of halting the travel cable 4, is to stop the upward movement of yoke 3, whereas carriage 2 to which cable 5 is attached, continues its vertical travel at an accelerated rate. As the carriage 2 continues to move upward, it is guided by rollers 2a at each corner of the carriage frame, these rollers being guided in a vertical path by projecting flanges or guide rails on the upright columns of tower 7. This forces the lower ends of strut members 2b upward, these struts in turn exerting an upward thrust upon the bucket shaft 1a to which said struts are pinned.

The yoke 3 is also pinned to both ends of said shaft but as there is no further upward travel of the cable 4 attached to this yoke, the conveying bucket is thrust outwardly from the hoist tower frame as the lower part of carriage 2 and yoke 3 are drawn closer to each other by continued travel of cable 5. This outward movement of the bucket from the tower is initiated in the direction desired by auxiliary guide members 7c acting upon guide rollers 2e attached to ends of the cross brace 2d between the strut members. 2b. Outward movement of the bucket thus initiated, continues until the motor driving the hoist machine is brought to a stop by a limit switch of the electric type commonly used for such a purpose. This switch is adjusted to function by cutting off electric current supplied to the hoist motor and applying a solenoid brake to said motor when cable 5 has traveled a predetermined distance. Movement of the bucket outwardly from the hoist tower as above described, is accompanied by a tilting action which is accomplished by means of a bar 1c of other means projecting beyond ends of the bucket 1, so as to engage the struts 2b, as the lower ends of these strut members are being drawn upwards while their upper ends are being thrust outwardly away from the hoist tower. As the carriage 2 continues to rise while the travel of cable 4 is halted by stop 4a against block 7b, this cable is held in vertical alignment with the sheaves 7a by means of sheaves 6, mounted on the top cross member of 2.

Stages in the upward movement of bucket 1, accompanied by its tilting and dumping action as above described, are illustrated in sequence by Figs. 3, 3A, 3B and 3C respectively. At the termination of this movement, the bucket 1 is found suspended at a distance from the hoist tower and at an elevation sufficient to clear a car or, if desired, a locomotive tender. In this location the bucket has been tilted at a sufficient angle to discharge its contents and further upward travel of the carriage 2 has been halted by stopping the motor of the hoisting machine with the limit switch arrangement above mentioned, which may be set to function thru a train of gears when the hoisting machine gears have made a certain number of turns in the direction of winding up cable 5. This switch mechanism may be of the common type that employ a timing relay device adjustable to remain "open" for a predetermined time interval (ordinarily a few seconds) then reverse the direction of electric current supplied to the hoisting machine motor so that this machine will then start running in the reverse direction, turning the hoist in a direction to unwind the cables.

At the moment this reverse movement is initiated, the pull upon cable 4 is obviously greater than on cable 5, due to the overhanging weight of the bucket in its dumping position and also due to position of strut members 2b, which are now upwardly inclined so as to convey a small vertical component force thrusting upwardly upon the carriage frame 2. Therefore, since the pull upon cables 4 and 5 is free to equalize within the hoisting machine, the immediate effect of reversing the hoist would be to allow bucket 1 to drop while carriage 2 remained stationary (or moved upward until blocked). To prevent the bucket 1 from thus dropping, chains 2f are fastened to the strut members 2b at approximately the point where these struts are pinned to the bucket 1, and at their other ends said chains are attached to the upper part of the carriage frame 2. The length of these chains is fixed so as not to allow the outer ends of strut members 2b to drop below the position required for tilting the bucket 1 into a dumping position. As an alternative to the chain 2f, I may elect to use any other form of tension member attached to carriage frame 2 and either fastened or latched to the struts 2b, or to the bucket itself (preferably at its supporting pins).

Now, when the hoisting machine starts to unwind cables 4 and 5, the weight of carriage frame 2 is sufficient to counteract the small upward thrust from the strut members 2b, and the carriage 2 starts to drop as cable 5 unwinds. To accelerate the reversal of the carriage frame 2 from an upward to a descending movement, as soon as the hoisting machine starts to unwind cable, I may employ such a device as a coil spring 5a which is compressed between the top member of said frame and the stop bracket 7b, on the top cross members of the hoist tower 7, as the carriage 2 approaches the limit of its upward travel. The positions shown in Figs. 3, 3A, 3B and 3C are now occupied in the reverse order by the bucket 1 and its carriage 2 in their descent. When the position illustrated by Fig. 3 is reached in the downward movement of carriage 2 (resulting from the unwinding of cable 5 by the hoisting machine), then cable 4 also starts to unwind, both cables playing out at the speed with which bucket 1 and its carriage 2 move down into the loading pit below ground level, at the foot of the hoist tower.

As the conveying bucket 1 descends toward the foot of the hoist tower 7, its carriage is guided by the rollers 2a at the four corners of the frame 2, said rollers being guided in the same vertical path as during the upward movement previously described, until near the foot of the tower where auxiliary guide rails 7c are provided and so spaced as to engage guide rollers 2e on both ends of a cross brace 2d between the strut members 2b. The auxiliary guide rails 7c are offset from the column supports of tower 7 so as to deflect the guide rollers 2e from their vertical path sufficiently to throw the bucket 1 slightly to that side of the tower on which it is desired to load the bucket. The effect of this movement is such that when the carriage 2 stops on reaching the floor of the pit into which it is being lowered, said bucket continues its movement away from the tower columns and downward in a radial path pivoting about the lower ends of struts 2b, by which this bucket is partially supported and follows this path as the cable 4 by which it is also supported thru yoke 3, unwinds from the hoisting machine, until the bucket 1 comes to rest on the floor of the pit. During this movement, cable 4 is again held in vertical alignment with the sheaves 7a by means of the sheaves 6 as shown in the drawings. The same electrical "limit" switch above described for stopping and reversing the hoisting machine motor when the bucket has been elevated to a dumping position, now serves to again stop the hoisting machine motor and after a desired interval (which may be automatically timed by devices commonly employed for that purpose) again starts the hoisting machine motor, this time in a direction to wind up cables 4 and 5.

When the hoisting machine again starts to wind up cables 4 and 5, with the conveying bucket 1 on the floor of the pit and to one side of the hoist tower 7, it is anticipated that the carriage 2 might start to rise while the bucket 1 remained on the floor of the pit, owing to the pull on cables 4 and 5 being equalized within the hoisting machine as in this position, the carriage would offer less resistance to lift thru cable 5 than would the conveying bucket thru cable 4. To prevent carriage 2 from lifting until the bucket 1 has been raised to a position approximately in line with the hoist tower columns, I may employ (as one of several available means), an extension 2c upon the lower end of each of the strut members 2b. In conjunction with these extensions I also employ a block member 7d, preferably in the form of a bar extending from column to column at the base of the hoist tower 7. When the bucket 1 has been lowered to the floor of the pit, the strut members 2b are in a reclining position and their lower extensions 2c project underneath block 7d. Being in this position, it is impossible for the carriage 2 to rise until the strut members 2b are again in an approximately vertical position, corresponding to a position of said bucket when in line with the hoist tower columns 7. This interlocking arrangement between parts 2c and 7d can be made even more effective by providing a notch in the extension 2c at base of the strut 2b. This notch acts as a latch bearing flatly upon the lower edge of block or bar 7d while the strut 2b is in a reclining position. An enlarged detail of this particular feature is shown in Fig. 4B.

Figs. 4 and 4A show the general outlines of a pit adapted for loading the conveying bucket 1, from a hopper 8, receiving coal, sand, ashes or the like from a car or locomotive standing on the adjacent track. The hopper 8 has an inclined outlet spout leading down into the bucket loading pit, said spout having a gate 8a, operated by a chain 8b, or other effective means. With the bucket 1, at rest on the pit floor as shown in Fig. 4, it is then in position to receive the contents of hopper 8, when the gate 8a is opened. The arrangement of track hopper 8, comprising two like units each positioned between the track rails so as to rest on the lower flanges of said rails along two edges of each unit and upon cross ties along the other two edges of each unit is shown in Figs. 4 and 4A. These hopper units 8, may be constructed in the form of a single metal casting (with exception of the gate mechanism) or these hopper units may be made from sheet metal plates welded together at their edges. The most distinctive feature of this hopper design is that it obviates the usual procedure of building a pit under the track necessitating structural bridge members to support the rails spanning the pit. With my invention it is simply necessary to space the ties somewhat further apart and stiffen the rails over these ties, then insert the two hopper units 8 in the rectangular spaces between the rails and the ties which have been spread apart.

The concrete pit into which the conveying bucket descends to its loading position has two openings in its side walls into which the spouts of each hopper unit 8 is inserted when these two units are placed in the rectangular openings between the track rails and ties. When the two hopper units 8, have thus been placed side by side in the position indicated, ballast material under the track is packed solidly around the ties and that portion of each hopper unit 8 that extends below the track. This gives the track the same medium of support as employed on either side of these hoppers, thus eliminating the more rigid support of structural beams under each rail across a concrete-walled pit, which construction creates what is known as a "hard spot" at the track and is particularly objectionable on main lines of track. The expense of pit construction requiring structural steel spans to support the track rails is also eliminated by my invention which not only reduces amount of excavation required but practically eliminates excavation directly below the track on which unloading hoppers are located. The two hopper units 8 to be used together are identical except that in one the spout is directed to the left and in the other to the right; also one unit 8 of each pair, has a projecting lip 8c to overlap the other unit, along abutting edges of the two units 8, thus forming a complete hopper assembly.

Figs. 5 and 5A depict the general outlines of a somewhat larger loading pit for the bucket 1, and also show a larger hopper 9, for receiving materials dumped by cars or locomotives standing on a track spanning said hopper. In this instance, a conventional type hopper of concrete construction is indicated, discharging thru a spout 9a, the opening of which is controlled by a gate 9b of the radial undercut type, automatically actuated by the bucket 1, thru a lever arm 9c, which is attached to the gate 9b and interlocks with a pin 9e, on the bucket 1. The manner in which 9c and 9e interlock is illustrated in larger detail by Figs. 5B and 5C, which show how the bucket 1, in descending to a position of rest upon the pit floor, engages the arm 9c by means of the pin 9e. The relative position of these parts is such that when the bucket 1 has descended to a position of rest on the pit floor, the gate 9b is fully opened and as the bucket again ascends it closes the gate leaving it in a closed position, which position is maintained by the counterweight 9d. By these means, the bucket is automatically filled from the contents of hopper 9 at each successive trip into the pit. Overflow from hopper 9, as the gate 9b opens, is prevented by material piling up in the bucket to an angle of repose against the opening of spout 9a and as the gate 9b is closed by raising the bucket, the flow from hopper 9 is cut off by an upward undercutting motion of said gate, assisted by the counterweight 9d.

A description of the hoisting machine above referred to will be more clearly understood by reference to Figs. 7 and 8 in which the essential parts of this feature of the invention are shown. Starting with a motor 12, which drives thru a shaft 12a, the next element encountered is a speed reducer 13, provided to reduce the driving shaft speed if the motor employed be of the usual electric high speed type. Other means of propelling the hoist, such as an internal combustion engine with reversing clutch drive which may not necessitate the speed reducing element 13, can be employed, but for the purpose of this description, I prefer to illustrate equipment of the type most available at this time, such as a high speed electric motor indicated by 12 and a speed reducer 13, of the worm gear type, driving a shaft 13a at right angles to shaft 12a. Shaft 13a is supported by bearings 13b and has keyed to it a gear pinion 13c. The pinion 13c meshes with a larger gear wheel 14. The gear 14 is mounted upon, but not keyed to a shaft 18, so that it is free to turn idly upon this shaft. In addition to its outwardly projecting teeth which mesh with pinion 13c, the gear wheel 14 also has inwardly projecting teeth that mesh with planetary gear pinions 15. These planetary pinions are mounted upon a framework consisting of pins, spokes and a hub, also supported by shaft 18 but not keyed to this shaft and therefore free to turn idly upon it. Another gear wheel 17, also mounted upon shaft 18, meshes with the planetary gear pinions 15. The gear wheel 17, however, is keyed to shaft 18, by means of key 18b.

As already explained, my invention requires two hoisting cables 4 and 5, and these two cables necessitate two winding drums, 16 and 19 in the hoisting machine. Each of these drums is supported upon the shaft 18. Drum 16 is not keyed to said shaft but is fastened rigidly to the above described frame upon which the planetary pinions 15 are mounted. The other drum, 19 is keyed to shaft 18, by means of a key 18b. Assuming now, a clockwise rotation of the motor 12, the shaft 12a and shaft 13a, then, a counterclockwise movement is imparted to the gear wheel 14, thru pinion 13c. The inwardly projecting teeth of the gear wheel 14 likewise impart counterclockwise rotation to the planetary gear pinions 15. These planetary gear pinions 15 may either transmit a clockwise rotation to the gear wheel 17, with which they also mesh or cause a counterclockwise rotation in the frame on which said planetary pinions are mounted; or the counterclockwise rotation of gear wheel 14 may result in simultaneously producing both a counterclockwise rotation in said planetary pinion frame and a clockwise rotation in gear wheel 17.

The rotation of drum 16 is the same in its direction and speed as the planetary gear supporting frame to which it is attached; while the rotation of drum 19 corresponds in direction and speed to the rotation of gear wheel 17, since both the gear 17 and drum 19 are mounted upon and keyed to shaft 18. Therefore, clockwise rotation of the driving motor 12 may simultaneously produce a counterclockwise rotation in drum 16 and clockwise rotation in drum 19, or vice versa. In assembling this machine, the two hoisting cables are wound upon their respective drums from opposite sides of the shaft 18, so that while the drums are being thus made to rotate in counter directions; both cables are either being unwound, or both wound upon their respective drums simultaneously.

It will be observed furthermore, that the tension upon either one of these cables is always free to equalize with the tension upon the other cable, whether the master gear 14 is stationary or turning in one direction or the other. That is, tension in the cable winding upon drum 16 produces a torque in the planetary gear supporting frame to which it is attached, while tension in the other cable, winding upon drum 19, produces a torque in the counter direction upon gear wheel 17 thru shaft 18 to which both are keyed. If the torque thus produced upon said frame tends to rotate it in a clockwise direction, the torque transmitted to gear 17 will tend to rotate it in a counterclockwise direction. But as the planetary gear teeth and the teeth of gear 17 mesh, the resultant forces set up by these opposing torques must balance each other at the points of contact between the teeth of said planetary gears and gear 17, the former being free to turn upon the latter independently of the master gear 14. Thus each variation in the respective tensions upon these cables causes the relative positions of both cables upon their drums to be altered until the tensions in both cables are again equal.

Since drums 16 and 19 are thus free to adjust their relative positions independent of gear 14, the hoist motor 12 may continue to operate in one direction or the other while the travel of either one of the cables is arrested or retarded. For instance, when travel of the cable winding upon drum 16 is arrested while the motor 12 is still driving the hoist in a clockwise direction, the frame supporting planetary pinions 15 becomes stationary, but as gear 14 continues to rotate in a counterclockwise direction, the planetary pinions 15 continue turning about fixed axes instead of turning in an orbital path, with the result that gear wheel 17 and drum 19 are rotated in a clockwise direction at a speed somewhat in excess of the speed of gear 14. When travel of the cable winding upon drum 19 is arrested, then gear 17 becomes stationary while the planetary pinions continue to turn upon this gear in an orbital path impelled by the inwardly projecting teeth of gear 14 with which said planetary gear pinions mesh. The result is a counterclockwise rotation of the planetary gear supporting frame and drum 16, at a somewhat lesser speed than gear 14. To compensate for the relatively lower speed of drum 16 than drum 19 under the circumstances outlined, I may in practice construct drum 16 with a larger diameter than drum 19.

The effect of arresting or retarding the travel of one cable while motor 12 continues at uniform speed to propel the hoist, is to accelerate the rate of travel in the other cable. While the conveying bucket 1, is moving up or down in a vertical path between the upright columns of the hoist tower, both cables 4 and 5, the one attached to yoke 3, and the other to carriage 2, are moving at the same speed. But when the travel of cable 4 is arrested by its stop block 4a and the stop bracket 7b, then, assuming that the speed of the motor remains unchanged, the speed of cable 5 is increased, accelerating the rate at which the conveying bucket is projected horizontally from the face of the hoist tower 7 and tilted into a dumping position. Likewise, when the travel of carriage 2 and its cable 5, terminates in the pit at the base of the hoist tower, then the speed of cable 4 is increased as the conveying bucket is lowered in a horizontally inclined path to its loading position. Thus, in my invention, the load upon a constant speed hoisting motor, or engine, is made more uniform in the process of elevating a conveying bucket from a loading to a dumping position since the vertical movement of this bucket is accomplished at a lesser speed than the cable speed employed to produce its horizontal displacement.

To stop and reverse motor 12 at the proper limit to the winding or unwinding movement of drums 16 and 19, I may employ electric contactor switch mechanism 20, of a type in common use wherein metallic segments are rotated thru a predetermined arc to break or make the electrical circuits required for stopping or starting motor 12 in the direction desired. In this instance I employ a train of gears 20a to actuate the switch 20, said train commences with a gear attached rigidly to the gear wheel 14, the switch 20 being adjusted to function when the gear wheel 14 has completed a predetermined number of revolutions (and fractions thereof) in one direction or the other, corresponding to the desired limits of travel for the conveyor bucket 1. Another attachment to this hoist which I may employ for drawing the conveying bucket 1, away from the base of the hoist tower to serve a number of track hoppers as shown only in Figs. 12 and 12A, is an auxiliary drum 21 mounted upon an extension of shaft 18, said drum being designed to wind or unwind a tail line cable 21a at a rate corresponding to the travel of cable 4 attached to yoke 3, said tail line being connected thru sheaves 21b to the conveyor bucket 1.

With two or more hoppers located on different tracks and each discharging into the same conveying bucket 1, this bucket must be moved a greater horizontal distance from base of the hoist tower than at installations where the hoppers are positioned on a single track only. This horizontal movement of the conveying bucket 1 may either be accomplished by transferring it to horizontally inclined supporting rails on which this bucket, with its additional supporting wheels 1b, may roll by gravity to a loading position at some distance from the tower base shown in Fig. 9; or, the conveying bucket 1 may be transferred to horizontal supporting rails running under a series of track hoppers 11, as shown in Fig. 12. Where there are two track hoppers 10, as in Fig. 9, these may be constructed generally in accordance with the design of hoppers 8 previously described, but provided in this instance with extended spouts 10a, directed toward each other, each of said spouts having a gate 10b, operated from the track level above by handles 10c. Where there are more than two track hoppers 11, as shown in Figs. 12 and 12A, an individual bucket loading position for each hopper may be employed and direct down-dumping track hoppers installed with gates 11a (of the common radial undercut type). Also, a combination of inclined bucket supporting rails 10d as shown in Fig. 9, with a hopper 11 as shown in Fig. 12, on the track nearest to the hoist tower columns 7 may be employed, together with a hopper 10 of the type shown in Fig. 9, on the track farthest from said hoist tower columns.

The means for disengaging bucket 1, from its supporting carriage 2, and transferring its path of travel to inclined supporting rails 10d, are shown in Figs. 10 and 11. For this purpose the strut members 2b of carriage 2, each have a fork at their upper ends (instead of a hole as previously shown) to engage the pins 1a on each end of the bucket supporting shaft. One of the prongs on each of the forked ends of struts 2b is made short enough to release the pin 1a as the bucket 1, supported by its wheels 1b on the inclined rails 10d, seeks to roll away from said struts which have now assumed an inclined position (approx. 45 degrees, or more as shown in Fig. 10). The other prong on each of these forked strut ends is made long enough to engage the pin 1a as the bucket 1 is drawn toward said struts. A block piece 10e is provided for resting the struts 2b in the inclined position at which the pins 1a are released from the forked ends of said struts. While the bucket 1 is thus released from the strut members 2b of its carriage 2, the yoke 3 still retains its hold on said bucket through pins 1a, and serves as a means together with cable 4 attached thereto, for drawing this bucket back up the inclined rails 10d to the position in which the pins 1a again engage the forked ends of struts 2b; after said bucket has been allowed, by paying out cable 4, to roll by gravity on its wheels 1b and the rails 10d, to a loading position at some distance from the base of the hoist tower columns 7. The two wheels 1b are purposely placed at different heights on each end of the conveying bucket 1, as shown in Fig. 10, so that when these rest on the inclined rails 10d, the bucket 1 will be supported in a level position.

The same principles of construction and operation as above described, are employed in transferring the conveying bucket 1 from its support by carriage 2 and strut members 2b, to the horizontal rails 11b shown in Figs. 12 and 12A. But in this embodiment of the invention, the wheels 1b are all placed at the same height on each end of bucket 1 to carry it in a level position while supported on rails 11b. The construction shown in these figures is particularly adapted to serving a number of track hoppers at the same level but requires some means other than gravity, such for instance as the auxiliary drum 21 and cable 21a running over sheaves 21b, for drawing the conveying bucket 1 to a loading position under any of these hoppers at will and then drawing the bucket back to the position at which its pins 1a will engage the forked ends of the struts 2b of carriage 2. Wherever forked ends of struts 2b are employed as in Figs. 9, 10 and 12, the elevating and dumping operations of the bucket 1 are the same as previously described for the reason that in each of these phases the forces acting upon pins 1a tend to keep these pins at all times firmly seated in the forked ends of struts 2b, as these members are always in compression while supporting said bucket.

Manipulation of the conveying bucket 1 in the horizontal gallery under a series of track hoppers as shown in Fig. 12, or upon inclined rails leading to a single loading position as shown in Fig. 9, can be accomplished by controlling the operation of hoist motor 12 to produce the desired revolutions of the cable winding drums 16, 19 and 21. The operation of motor 12 is susceptible to exact control by means of various electrical switch devices now available which in turn respond to manual control or automatic stopping and starting at predetermined points dependent on the position of the conveying bucket.

Still another modification in the construction to which my invention is adapted, would involve track hoppers on both sides of the hoist tower columns 7, with provision for shifting the auxiliary guides 7c so as to throw the conveying bucket 1 to one side or the other of said columns, at will, thus effecting a loading of said bucket from track hoppers on either side of the columns 7 as desired. Likewise, additional auxiliary guides can be provided with my invention to initiate an outward displacement of the conveying bucket 1 on either side of the columns 7 as said bucket is ascending to a dumping position and thus throw this bucket out over a car on either side of columns 7, at will, then tilt said bucket into a dumping position in the manner previously described.

Having thus set forth the purpose of this invention and described its principal features and the method of operation involved, I now claim as new:

1. A conveying bucket, a shaft structure, a hoisting machine having mechanism for differentially drawing dual hoist cables, a yoke pivotably pinned at its lower ends to said bucket, a bail guided in said shaft, struts pivotably pinned at their normally upper ends to said bucket and at their normally lower ends to said bail, one of said cables suspending said yoke and the other cable suspending said bail, means for arresting the travel of either cable while the other continues to be drawn by said hoist mechanism, so as to produce at will, any desired inclination of the yoke to said shaft guided bail.

2. A conveying bucket, a shaft structure, a hoisting machine having mechanism for differentially drawing dual hoist cables, a yoke pivotably pinned at its lower ends to said bucket, a bail guided in said shaft, struts pivotably pinned at their normally upper ends to said bucket and at their normally lower ends to said bail, one of said cables suspending said yoke and the other cable suspending said bail, means for retarding the travel of either cable in relation to the other as it continues to be drawn by said hoist mechanism, so as to produce at will, any desired inclination of the yoke to said shaft guided bail.

3. A conveying bucket, a shaftway, a hoisting machine having mechanism for differentially drawing dual hoist cables, a bucket bail suspended from one of said cables and a bucket yoke suspended from the other cable, said bucket being jointly supported by both bail and yoke, said hoist mechanism adapted to differentially draw said cables so as to vary the relative movement of said bail and yoke in such manner that the jointly supported bucket can be raised, lowered or projected horizontally from the face of said shaftway without the guidance or support of any fixed structural member thereof.

4. Hoisting mechanism capable of elevating a conveying bucket from a loading position to a dumping position or vice versa, said hoisting mechanism having a propelling engine or motor, a planetary system of gears, dual cable winding drums that can be rotated in response to the propelling force of said engine or motor exerted thru said planetary gears, a cable winding upon each of said drums, one cable leading directly down to a flexible yoke connection from which said conveying bucket is suspended, the other cable being independently attached to a bail surrounding and pivotably connected to said bucket by means of supporting struts from pivot points below, means for arresting travel of the yoke-connected cable near the termination of the upward movement of said bucket such that continued propulsion of the hoist thru said planetary gears will then tend to relatively accelerate the travel of the bail-connected cable, also means for arresting travel of said bail near termination of the downward movement of said bucket so that continued operation of the hoist in that direction thru said planetary gears will then tend to relatively accelerate the travel of the yoke-connected cable, structural guides to initiate horizontal movement of the bucket as the travel of one or the other of said cables is arrested and means for stopping and reversing the hoist when the relative movements of said yoke and carriage has sufficed to produce the desired horizontal displacement of said conveyor bucket in combination with its vertical travel.

5. Hoisting mechanism capable of causing a conveying bucket to be raised or lowered in an upright shaft-way at a comparatively low speed or shifted in a lateral direction relative to said shaft-way at a comparatively higher speed, said hoisting mechanism having a propelling force adapted to impart its motion to a pinion, a master gear adapted to receive its motion from said pinion, planetary gear pinions adapted to receive their motion from said master gear, a cable winding drum adapted to be rotated solely by the orbital movement of said planetary pinions and a second cable winding drum adapted to be rotated by the orbital and/or revolutionary movement of said planetary pinions, a cable winding upon one of said drums and attached at its other end to a flexible yoke connection from which said conveying bucket is suspended, a second cable winding upon the other of said drums and attached at its other end to a bail, pivotably connected to said bucket by means of supporting struts from pivot points below, means for arresting travel of the yoke-connected cable near the termination of the upward movement of said bucket such that continued propulsion of the hoist thru said planetary gears will then tend to relatively accelerate the travel of the bail-connected cable, also means for arresting travel of said bail near termination of the downward movement of said bucket so that continued propulsion of the hoist in the same direction thru said planetary gears will then tend to relatively accelerate the travel of the yoke-connected cable, structural guides to initiate horizontal movement of the bucket as the travel of one or the other of said cables is arrested and means for stopping and reversing the hoist when the relative movements of said yoke and bail have sufficed to produce the desired horizontal displacement of said conveyor bucket in combination with its vertical travel.

6. A conveying bucket, a shaft structure wherein the maximum horizontal displacement of all its fixed structural members does not exceed the width of a single vertical beam having the cross-sectional area and section modulus required to support said bucket, a hoisting machine having mechanism for differentially drawing dual hoist cables, a bucket bail suspended from one of said cables and a bucket yoke suspended from the other cable, said bucket being jointly supported by both bail and yoke, said hoist mechanism and differentially drawn cables actuated by a single motor so as to vary the relative movement of said bail and yoke in such manner that the jointly supported bucket can be raised, lowered or projected horizontally from the face of said shaft structure without the guidance or support of any fixed structural member thereof.

LELAND G. PLANT.